United States Patent
Markham et al.

[11] Patent Number: 6,152,492
[45] Date of Patent: Nov. 28, 2000

[54] LIQUID STORAGE TANK TRAILER

[75] Inventors: Gary R. Markham, Lumberton; Edgar L. Wolf, Nederland, both of Tex.

[73] Assignee: The Modern Group, Inc., Beaumont, Tex.

[21] Appl. No.: 09/078,994

[22] Filed: May 14, 1998

[51] Int. Cl.⁷ .................................................. B60P 3/22
[52] U.S. Cl. .................. 280/837; 182/113; 220/564; 220/DIG. 24; 280/164.1; D12/95
[58] Field of Search ..................... 280/830, 837, 280/839, 163, 164.1; 220/DIG. 24, 562, 564, 1.5, 4.12, 4.21, 505, 567.2; 182/51, 127, 113; 296/241, 181, 100; D12/95, 102

[56] References Cited

U.S. PATENT DOCUMENTS

| | | |
|---|---|---|
| D. 136,705 | 11/1943 | Meyer . |
| D. 173,304 | 10/1954 | Daiglish . |
| D. 193,294 | 7/1962 | Mendez . |
| D. 211,723 | 7/1968 | Vromen et al. . |
| D. 213,951 | 4/1969 | Wills . |
| D. 220,174 | 3/1971 | Holland . |
| D. 238,259 | 12/1975 | Sweet et al. . |
| D. 253,051 | 10/1979 | Pletcher . |
| D. 256,348 | 8/1980 | Galloway . |
| D. 274,321 | 6/1984 | Hayes et al. . |
| D. 298,273 | 10/1988 | Cobb . |
| D. 301,326 | 5/1989 | Adams . |
| D. 318,033 | 7/1991 | Pelt . |
| D. 348,304 | 6/1994 | Norman, Jr. et al. . |
| D. 353,352 | 12/1994 | Holloway, Jr. . |
| D. 375,470 | 11/1996 | Adams . |
| D. 378,810 | 4/1997 | Norman, Jr. et al. . |
| D. 378,907 | 4/1997 | Garzancich et al. . |
| D. 379,948 | 6/1997 | Wade . |
| D. 383,092 | 9/1997 | Garzancich et al. . |
| D. 384,913 | 10/1997 | Norman, Jr. et al. . |
| 2,877,858 | 3/1959 | Knight . |
| 4,406,471 | 9/1983 | Holloway . |
| 4,589,565 | 5/1986 | Spivey . |
| 4,613,053 | 9/1986 | Kimura et al. . |
| 4,874,184 | 10/1989 | Boyer . |
| 5,004,269 | 4/1991 | Pelt . |
| 5,058,924 | 10/1991 | Whatley, Jr. . |
| 5,122,025 | 6/1992 | Glomski . |
| 5,213,367 | 5/1993 | Norman, Jr. et al. . |
| 5,273,180 | 12/1993 | Whatley, Jr. . |
| 5,671,855 | 9/1997 | Norman, Jr. et al. . |

FOREIGN PATENT DOCUMENTS

| | | |
|---|---|---|
| 2623353 | 5/1976 | Germany . |
| 5U831945 | 7/1979 | Russian Federation . |

OTHER PUBLICATIONS

Brochure; Dragon Products & Rentals; "The Dragon Introduces Two New Players For Your Winning Team".

*Primary Examiner*—Anne Marie Boehler
*Attorney, Agent, or Firm*—Fulbright & Jaworski L.L.P.

[57] ABSTRACT

A mobile fluid storage tank having a base, a substantially vertical front wall, a substantially vertical rear wall, a pair of substantially parallel vertical sides walls, and a roof. The roof has a rear roof portion and a front roof portion. The rear roof portion extends across the rearward portion of the side walls, while the front roof portion is comprised of two different portions, a sloped portion and at least a two-stepped portion. The sloped and step portions are substantially parallel to each other. The stepped portion is comprised of at least two steps. The storage tank also has an inclined stairway attached to the front wall and extending from the stepped portion adjacent one side wall downwardly to the base portion adjacent the opposite side wall.

20 Claims, 4 Drawing Sheets

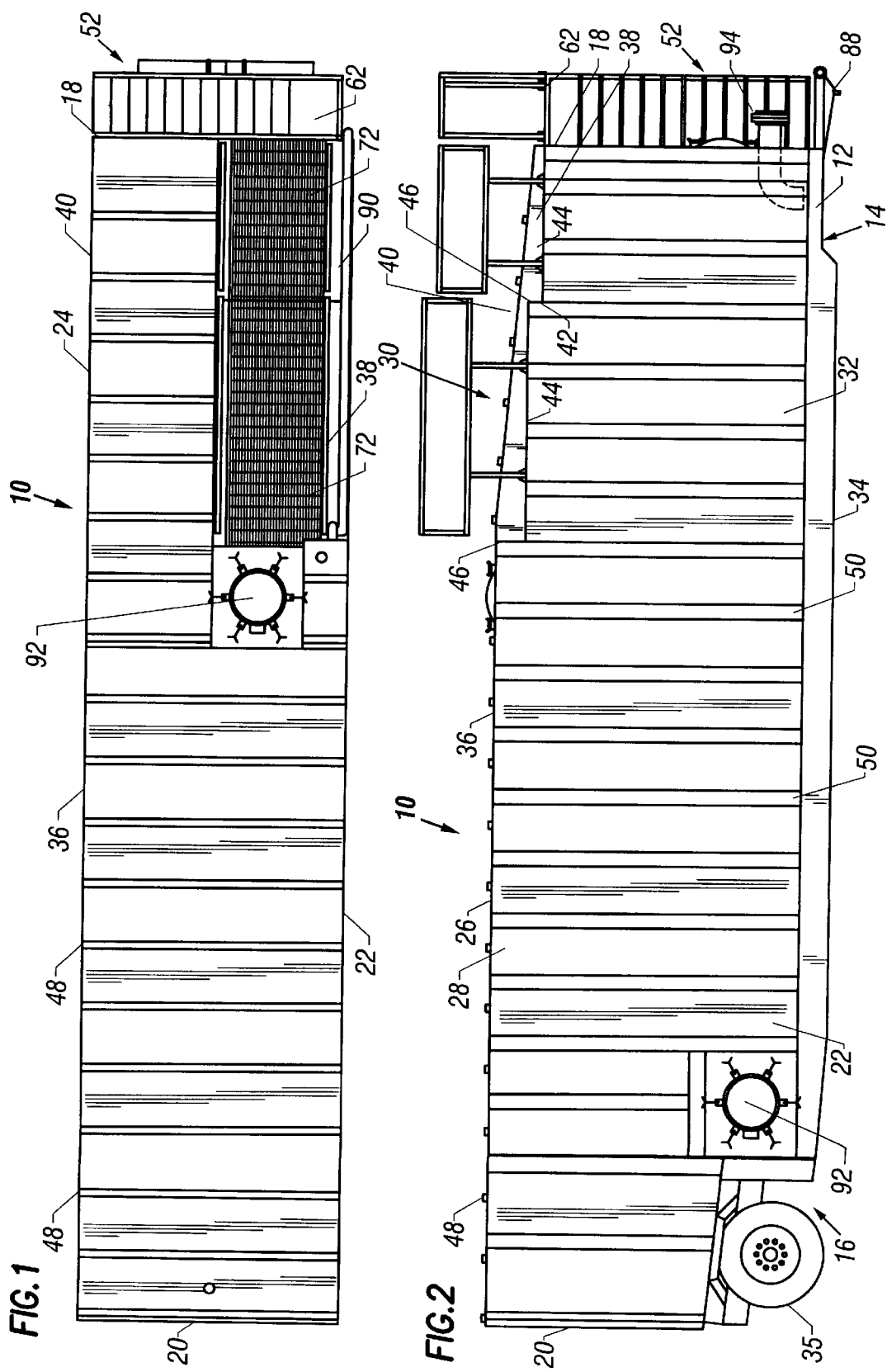

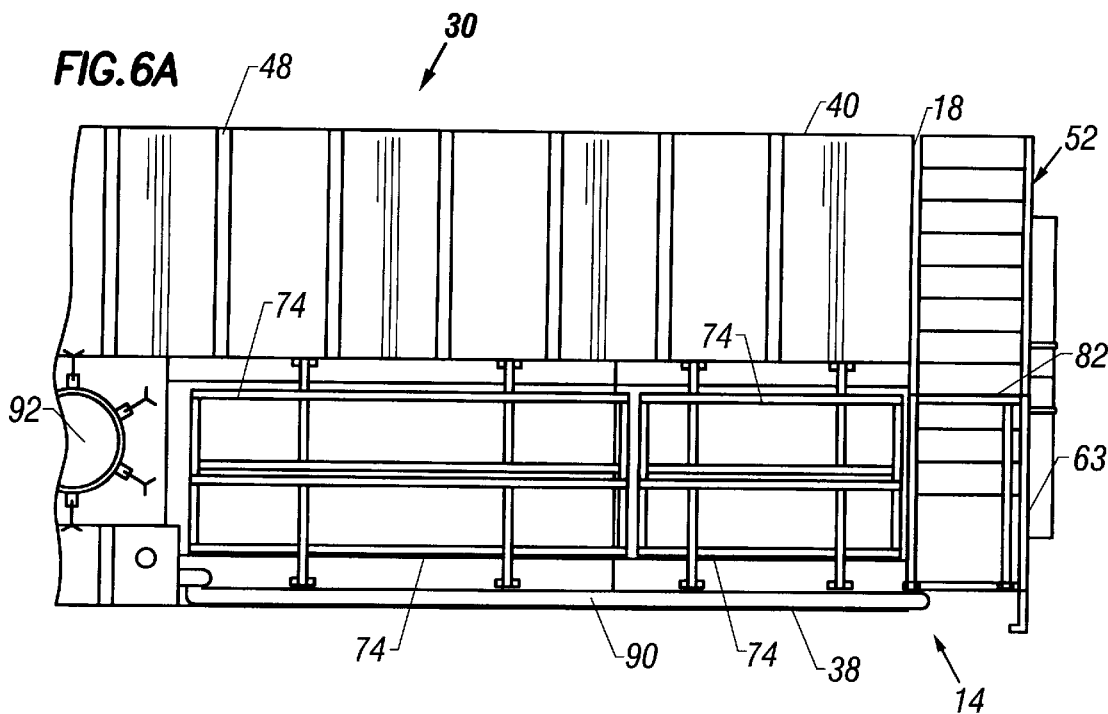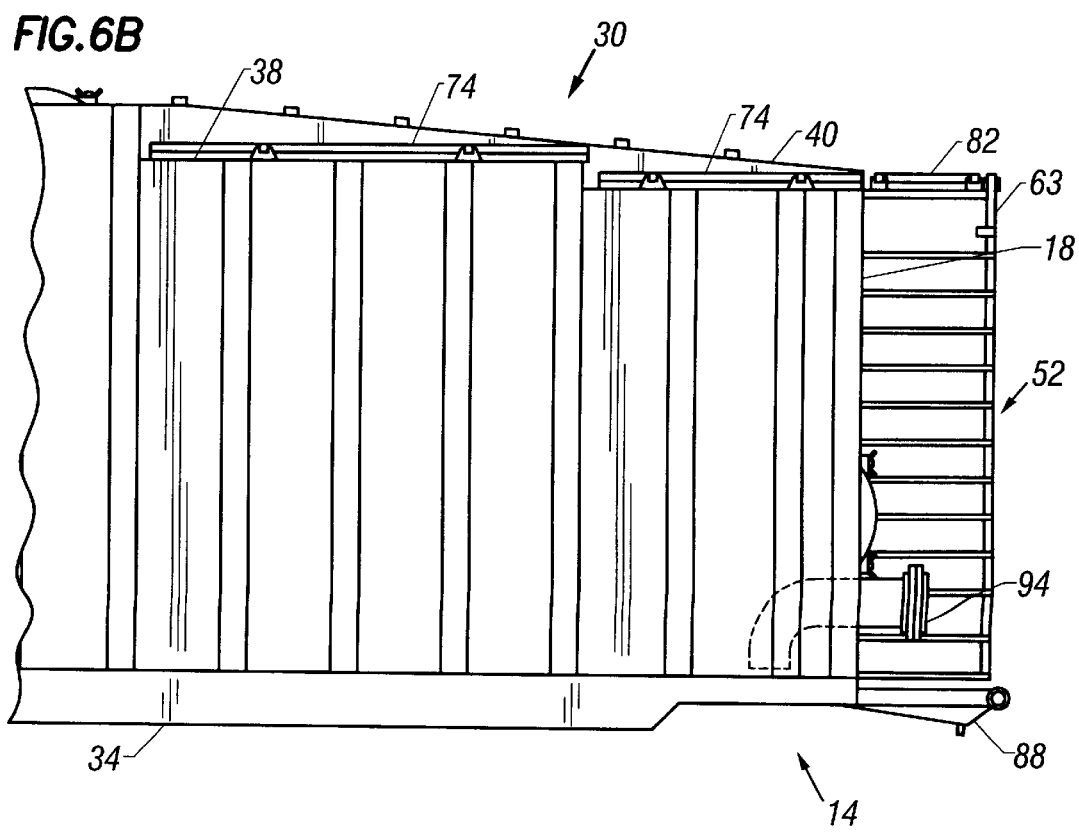

LIQUID STORAGE TANK TRAILER

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to a liquid storage tank trailer. More particularly, the present invention relates to an improved mobile liquid storage tank trailer with enhanced safety features.

2. Description of the Related Art

A number of different types of fluid storage tank trailers exist which can be towed from one location to another. Two such tank trailers are described in U.S. Pat. Nos. Des. 253,051, and 4,874,184. These fluid storage tanks are generally trapezoidally-shaped from the forward end to the rear end enabling them to be supported at the rear end upon a pair of ground engaging wheels at a time when the fluid storage tank has its front end lifted upwardly, and secured behind a towing vehicle so that the top of the tank becomes substantially horizontal.

The trapezoidally-shaped fluid storage tanks of U.S. Pat. Nos. Des. 253,051 and 4,874,184 are constructed such that when the tank is resting upon the ground, the tank top slopes gradually downward. A problem with this type of construction, however, is that when a person is standing on the top of the tank for purposes of filling, cleaning and performing other operating and maintenance procedures, the sloped top of the tank presents a substantial risk of slipping and falling to that person. This is particularly true in inclement weather conditions where the top of the tank has become iced or is extremely slick.

Solutions to this problem have been attempted in the past in which stepped tops have been provided. For example, U.S. Pat. No. 5,004,269 describes a fluid storage tank having a top comprised of a multitude of discrete steps which gradually slope downward from the rear to the front of the tank, when the tank is unhooked from a towing vehicle and resting on the ground. Similarly, U.S. Pat. No. 5,213,367 also describes a fluid storage tank that has a top comprised of a single discrete step.

Unfortunately, both of these construction designs create additional problems. One such problem is the cost of constructing these tanks. Tanks having a sloped surface, though quite dangerous to walk on, are much cheaper to build than multi-stepped tanks since they are constructed of a single piece of sloping material. On the other hand, the multi-step tank design in which the steps extend from one side of the tank to the other is much more complicated, costly and time-consuming to build as each riser piece and step plate must be individually constructed and then fit together.

In addition to the additional construction cost, both the multiple step top tank of U.S. Pat. No. 5,004,269 and the single, bi-level top tank of U.S. Pat. No. 5,213,367 require vertical ladders for a person to access the top. Such vertical ladders present a significant safety hazard, particularly in inclement weather where the vertical ladders may become slick or slippery.

Thus, both safety and economics have driven the need for a mobile fluid storage tank having a roof top that is not dangerous to workers walking thereon, that does not require a vertical ladder for access, and yet is relatively simple to construct.

SUMMARY OF THE INVENTION

The present invention provides a mobile fluid storage tank. This mobile fluid storage tank has a base with a front and rear end. On the front end of the base portion is a substantially vertical front wall and on the rear end of the base portion is a substantially vertical rear wall. A pair of substantially parallel vertical sides walls are attached to the base portion and to the front and rear walls. There is a rear end roof portion extending across the rearward portion of the side walls defining a rear storage chamber and a front end roof section extending across the forward portion of the side walls that defines a front storage chamber. The front and rear storage chambers are in fluid communication with each other. The rear end roof portion is generally rectangular in shape and is in a substantially horizontal plane. The front roof portion is comprised of two different portions, a sloped portion and at least a two-stepped portion. The sloped and stepped portions are substantially parallel to each other. The stepped portion is comprised of at least two steps, each step having a step plate and a riser plate. The precise number of steps on the stepped portion will depend on the location of the controls on the top of the storage tank; two, three or more steps on the stepped portion may be desired. An edge of the riser plate of each step extends generally normal to the step plate and is joined to an edge of the step plate. The storage tank has an inclined stairway that is attached to the front wall and extends from the stepped portion adjacent one side wall downwardly to the other side wall to the base portion.

BRIEF DESCRIPTION OF THE DRAWINGS

A better understanding of the invention can be obtained when the detailed description of exemplary embodiments set forth below is reviewed in conjunction with the accompanying drawings, in which:

FIG. 1 is a plan view of the top of a mobile fluid storage tank of the subject invention;

FIG. 2 is a plan view of one side of the storage tank of the subject invention;

FIG. 6A is partial a plan view of the top front portion of the storage tank of the subject invention with the side rails in a folded position; and FIG. 6B is a partial plan view of a portion of one side of the storage tank of the subject invention with the side rails in a folded position.

DETAILED DESCRIPTION OF INVENTION

Figure 3:
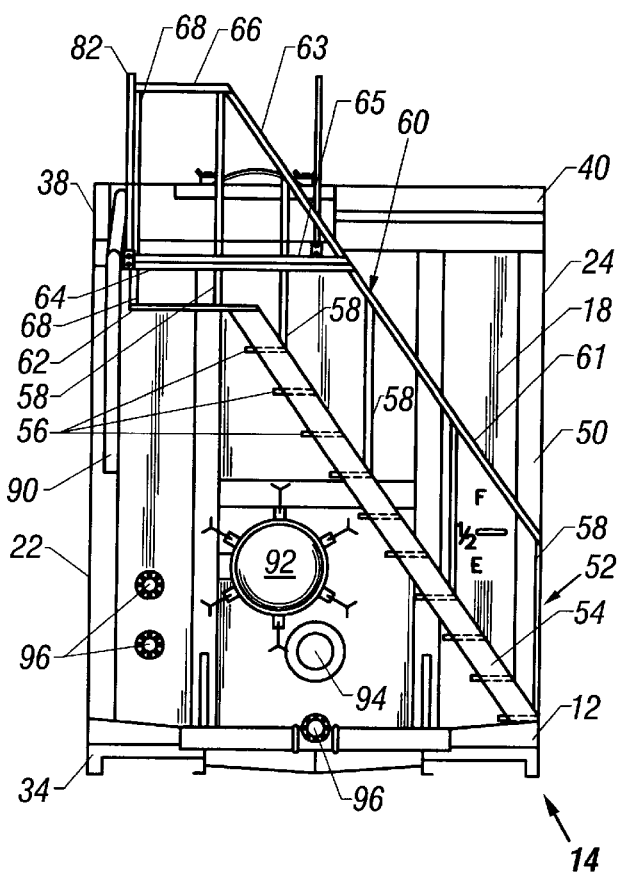
FIG. 3 is a plan view of the front end of the storage tank of the subject invention.

The mobile fluid storage tank 10 of the instant invention, as shown in FIGS. 1 and 2, includes a base portion 12 having a front end 14 and a rear end 16, a substantially vertical front wall 18 attached to the front end 14 of the base portion 12 and a substantially vertical rear wall 20 attached to the rear end 16 of the base portion 12. A pair of substantially parallel vertical side walls 22, 24 are attached to the base portion 12 and to both the front and rear walls 18, 20; however, the shape of each side wall is different. The first side wall 22 has an irregular decagonal shape, while the second side wall 24 has an irregular heptagonal shape. A rear end roof portion 26 extends across the rearward portion of the side walls 22, 24 defining a rear storage chamber 28 and a front end roof section 30 extends across the forward portion of the side walls 22, 24 defining a front storage chamber 32. The rear and front storage chambers 28, 32 are in fluid communication with each other. The base portion 12 of the storage tank 10 also includes a plurality of parallel longitudinal skids 34 or runners (that allow the storage tank 10 to be moved along the ground when in use) and a wheel base having at least one axle and a plurality of wheels 35 for towing the storage tank 10 by a tractor.

As best shown in FIGS. 1–3, the rear and front end roof portions 26, 30 of the storage tank 10 together define three different portions: a substantially horizontal rear portion 36, and a bi-partite front portion comprised of a tri-level step portion 38 and a substantially sloped portion 40. The tri-level step portion 38 provides downward steps from the horizontal rear portion 36 to the front 14 of the storage tank 10. The stepped portion 38 includes at least two steps 42, with each step 42 including a step plate 44 and a riser plate 46 extending normally to the step plate 44 with the riser plate 46 being joined at the edge thereof to the step plate 44. The substantially sloped portion 40 extends gradually downward from the horizontal rear portion 36 to the front end 14 of the tank 10. In a preferred embodiment, the horizontal rear roof portion 36 and the substantially sloped portion 40 are reinforced by transversely extending ribs 48 and the parallel side wall portions 22, 24, and the front and rear walls 18, 20 are reinforced by vertically extending ribs 50.

An inclined stairway assembly 52 is attached to the front wall 18 and extends from the stepped portion 38 adjacent the first side wall 22 downwardly to the second wall 24 approximate the base portion 12. As illustrated best in FIG. 3, the stairway assembly 52 in general includes a pair of upwardly inclined, horizontally-spaced, parallel risers 54 having a plurality of vertically-spaced horizontal offset or staggered steps 56 extending between the risers 54 as in conventional stairway construction. Preferably, the steps 56 are constructed of a skid resistant metal grading. In a preferred embodiment, one or both of the risers 54 can include a plurality of ladder posts 58 extending upwardly at spaced intervals along the length of the riser 54.

A hand rail 60 is located above at least one of the parallel risers 54. The lower end of the hand rail 60 is secured to the upper end of a first ladder post 58 with the upper end portion of the hand rail 60 connected to a top ladder post 68. The top of the stairway assembly 52 includes a generally square shaped platform 62 that is positioned a small distance below the roof line of the tri-level step portion 38. In a preferred embodiment, one or two sections of parallel horizontal tubing 64, 65 are positioned a short distance above the edge of the stairway platform 62, and extend from the ladder post 68 to intersect and connect to an upper portion of the hand rail 60. This horizontal tubing 64, 65 divides the hand rail 60 into two parts with the lower section 61 of the hand rail 60 being stationary and the upper section 63 of the hand rail 60 being hingedly connected to the horizontal tubing 64 so that it can be folded down during over-the-road transport of the storage tank 10. The upper end of the hand rail 60 is connected to one end of a short section of horizontal tubing 66 that is joined at its other end to the vertically extending post 68.

Figure 4:
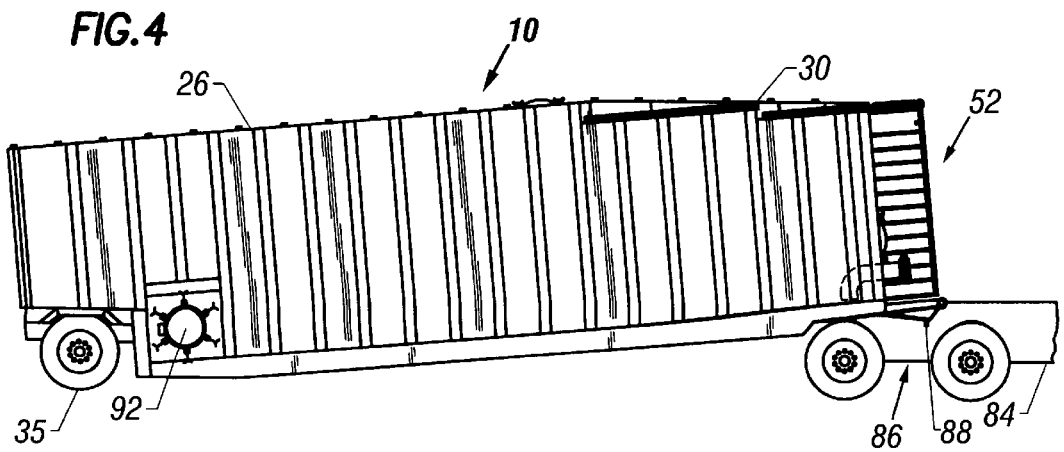
FIG. 4 is a schematic illustration of the storage tank of the subject invention connected to a portion of a tractor vehicle for the purpose of over-the-road transport.

This configuration of hand rail 60, tubing 66 and post 68 forms a trapezoidally configured upper foldable hand rail section 63 of the stairway assembly 52. The trapezoidally-shaped upper hand rail section 63 of the stairway assembly 52 is connected to the horizontal tubing 65 in a known manner and the horizontal tubing 65 is hingedly connected to the horizontal tubing 64 in a known manner. It is to be understood that other configurations can be used to form the foldable upper hand rail section 63. During over-the-road transport of the storage tank 10, the trapezoidal upper hand rail section 63 of the stairway assembly 52 can be folded downwardly about the hinges in order to be positioned below the front roof line of the storage tank 10, as illustrated in FIGS. 4 6A and 6B.

Figure 5A:
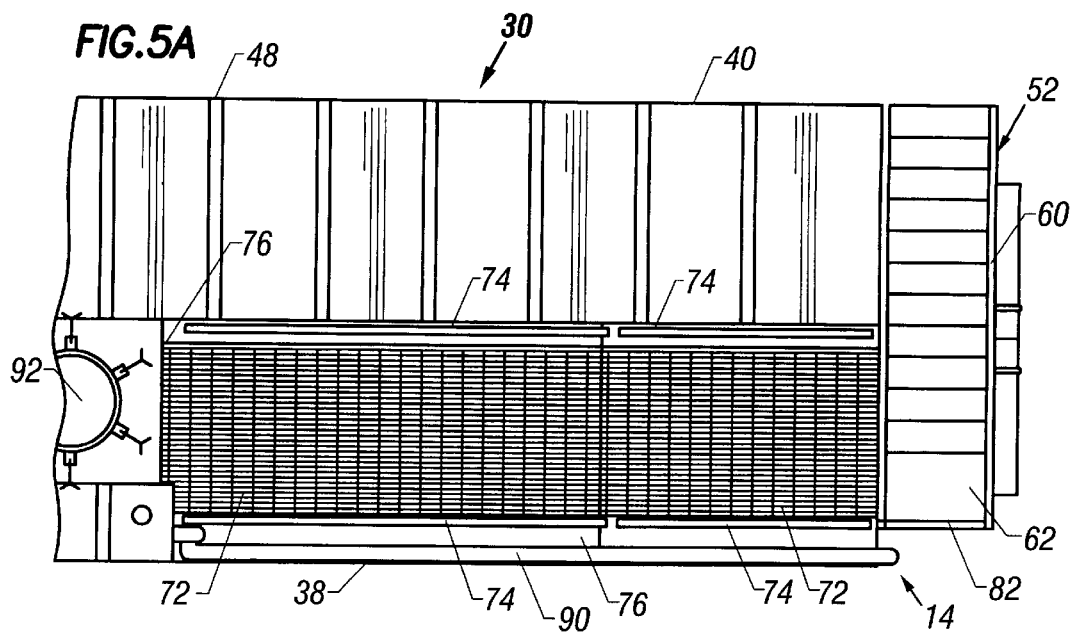
FIG. 5A is partial a plan view of the top front portion of the storage tank of the subject invention with the side rails in an upward position.

The tri-level step portion 38 of the front roof 30 includes a two step walkway assembly 70 that is comprised of foot walks 72 and two sets of parallel foldable hand rails 74, as illustrated in FIGS. 1, 2, and 5A and B, which shows the hand rails 74 in their upwardly extended position. The foot walks 72 consist of a pair of horizontally extending side-by-side foot walks 72 that are preferably formed of a skid resistant metal grading that is placed in a raised position on each of the two step plates 44 of the tri-level step portion 38 of the front roof 30.

The two pairs of longitudinally aligned, vertically extending, foldable hand rail sections 74 are placed along the opposite longitudinally extending side edges 76 of the foot walks 72. The hand rail sections 74 are aligned parallel to the fore and aft axis of the storage tank 10 and are pivotally mounted for extension upwardly so they can be place in an operative position in opposed parallel vertical planes. The hand rail sections 74 are located on opposite sides of the foot walks 72 in order to provide safety to workmen walking along or working upon the forward tri-level step portion 38 of the front roof 30. The hand rail sections 74 can include horizontally and vertically extending bars interconnected in various configurations. The hand rail sections 74 can be substantially any height desired by reason of the location of the hand rail sections 74, and the manner in which they can be folded downwardly into a horizontally extending position atop the forward roof 30.

Figure 5B:
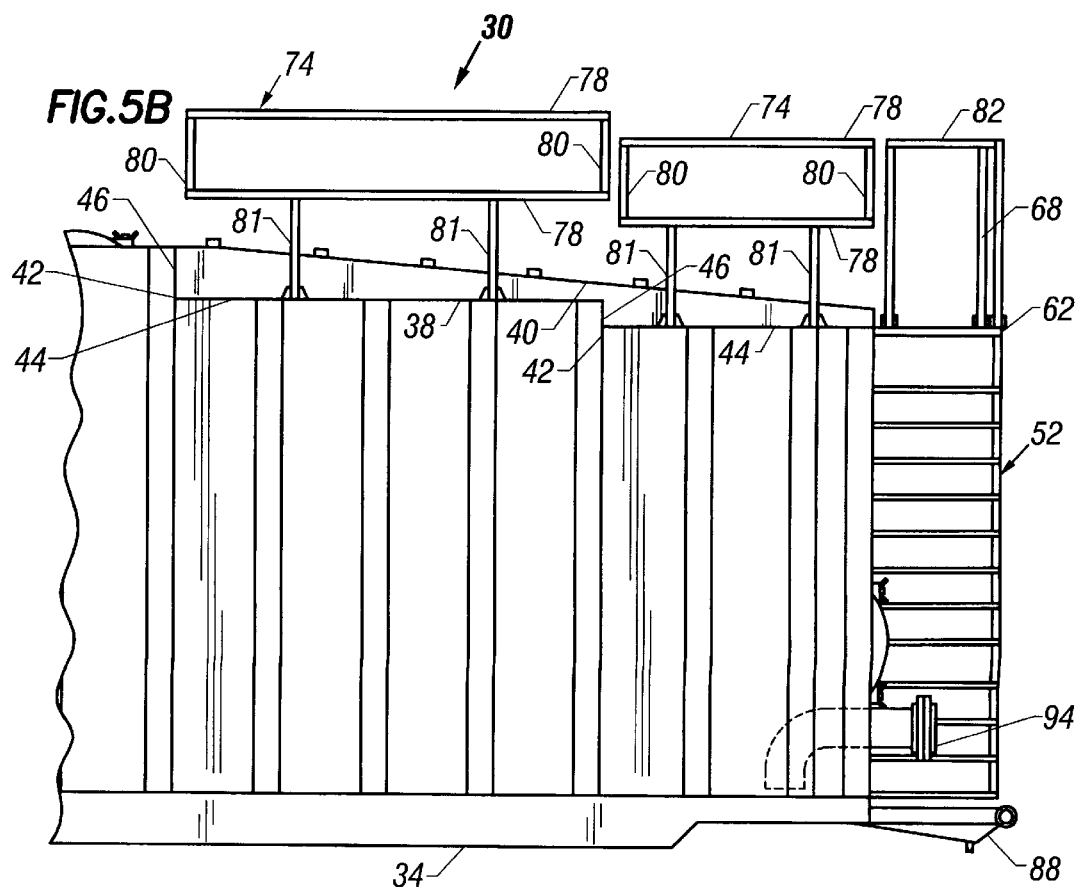
FIG. 5B is a partial plan view of a portion of one side of the storage tank of the subject invention with the side rails in an upward position.

Detailed construction of two typical hand rail sections 74 used in a preferred embodiment is depicted in FIGS. 2 and 5B. Each hand rail section 74 is generally in the shape of a rectangle having a pair of vertically-spaced, horizontally extending parallel rails 78 interconnected by a pair of vertical posts 80. Each rectangular-shaped hand rail section 74 is attached, by welding or other means, to two spaced apart vertical posts 81 that are hingedly connected in a known manner to each of the two step plates 44 of the tri-level step portion 38 at the front roof 30.

A safety gate 82 is located on the end of the stairway platform 62 as illustrated in FIGS. 2 and 5B. The safety gate 82 is generally rectangular in shape, is generally the same height as the upper hand rail section 63, and is in longitudinal alignment with the hand rail sections 74 of the walkway assembly 70. The safety gate 82 is hingedly connected by hinges or other known means to one end of the stairway platform 62. The safety gate 82 can be latched in the upward position when the storage tank 10 is resting upon the ground and is being used for storage of liquids. The safety gate 82 provides a safe access to the work area from the stairway assembly 52. When the storage tank 10 is to be transported over-the-road, the safety gate 82 folds down over the stairway platform 62 in order to be positioned below the front roof line of the storage tank 10. The walk way assembly 70 and the stairway assembly 52 facilitate safe access to the top roof of the storage tank 10 when it is resting upon the ground and is being used for the storage of liquids.

When the storage tank 10 is to be transported over-the-road, it is necessary, in order to bring the tank dimensions within the height limits imposed by law, to fold the walk way assembly 70, the safety gate 82, and the upper hand rail section 63 downwardly from their vertical extending positions, as illustrated in FIGS. 6A and 6B. FIG. 4 illustrates the over-the-road transport position of the storage tank 10, when it is connected to a tractor vehicle 84. A portion of the tractor vehicle 84 is illustrated in FIG. 4 and it shows the fifth wheel 86 of the vehicle 84 connecting to a king pin 88 of the storage tank 10 when placed in position to tow the empty storage tank 10.

As has been previously pointed out, the flat forward area of the tri-level step portion 38 of the roof provides a readily accessible work area or space at the forward end 30 of the storage tank 10. The difference in height between the horizontal rear roof portion 36 and the tri-level step portion 38 provides a convenient location to which a fill line 90 can be attached via a suitable fitting in the riser 54. The fill line 90 is used for filling the tank with liquids. The work area also enables access to a hatch or manway 92 that can be employed for gaining access to the interior of the tank 10 for cleaning purposes, or even to allow a person to enter the tank 10 at this location. Other hatches or manways 92 can be provided as shown in FIGS. 1–3. An additional inlet/outlet line 94 can also be located on the front wall 18 beneath the front manway 92. A variety of other drains 96 can also be provided as shown in FIG. 3.

The difference in heights between the back and front portions 26, 30 of the roof allows the storage tank 10 to be towed via the king pin-type connection 88 to the fifth wheel 86 of a towing vehicle 84. For example, when the shorter front portion 30 of the tank is elevated for connection to the fifth wheel 86 of a towing vehicle 84, the height of the entire storage tank 10 does not exceed the maximum height dimensions provided by law. This provides sufficient clearance for passage beneath overpasses and through tunnels. At the same time, when the storage tank 10 is resting on the ground, the degree of sloping and the tri-level step portion 38 provides access to the top of the storage tank 10 via a single staircase 52 with no additional vertical ladder or other means being necessary to reach the top of the storage tank 10.

The foregoing disclosure and description of the invention are illustrative and explanatory thereof, and various changes in the details of the illustrated apparatus and construction and method of operation may be made without departing from the spirit of the invention.

What is claimed is:

1. A mobile fluid storage tank comprising:
    a base portion having a front end and a rear end;
    a substantially vertical front wall attached to the front end of said base portion;
    a substantially vertical rear wall attached to the rear end of said base portion;
    a pair of substantially parallel vertical side walls attached to said base portion and to said front and rear walls, said pair of parallel vertical side walls including a first vertical side wall and a second vertical side wall;
    a rear end roof portion extending across the rearward portion of said side walls defining a rear storage chamber;
    a front end roof portion extending across the forward portion of said side walls defining a front storage chamber so that said rear and front storage chambers are in fluid communication;
    said front end roof portion comprising a sloped portion and at least a two-stepped portion, said sloped portion being substantially parallel with said stepped portion;
    said stepped portion comprising at least two steps, each step including a step plate and a riser plate extending generally normal to said step plate, said riser plate being joined at an edge thereof to said step plate; and
    an inclined stairway attached to said front wall and extending from said stepped portion adjacent one side wall downwardly to the other side wall proximate said base portion.

2. The mobile fluid storage tank of claim 1, wherein said first vertical side wall has a generally irregular decagonal shape and is positioned adjacent said two stepped front roof portion.

3. The mobile fluid storage tank of claim 1, wherein said second vertical side wall has a generally irregular heptagonal shape and is positioned adjacent said sloped front roof portion.

4. The mobile fluid storage tank of claim 1, wherein the inclined stairway further comprises:
    a pair of parallel, upwardly and laterally extending risers along said forward wall;
    a plurality of steps extending between said risers;
    a hand rail disposed above and extending parallel to said risers, said hand rail having an upper section and a lower section separated from said upper section; and
    said upper section including a trapezoidally configured shape and being pivotally connected to said lower section for allowing said upper section to pivot from an upwardly extending position to a folded down position.

5. The mobile fluid storage tank of claim 4, wherein the inclined stairway further includes a platform positioned on said stairway adjacent said stepped portion, said platform including a pivotally connected generally rectangular-shaped gate positioned opposite said plurality of steps and perpendicular to said hand rail.

6. The mobile fluid storage tank of claim 1, wherein each step of the stepped portion includes a walkway and two sets of parallel foldable hand rails, each set of parallel foldable hand rails being positioned on opposite sides of said walkway.

7. The mobile fluid storage tank of claim 6, wherein the walkway comprises a horizontally extending foot walk positioned a short distance above each step plate.

8. The mobile fluid storage tank of claim 7, wherein each foot walk is formed of a skid resistant metal grading.

9. The mobile fluid storage tank of claim 1, wherein the rear end of said mobile fluid storage tank includes a wheel base, at least one axial and a plurality of wheels.

10. The mobile fluid storage tank of claim 1, wherein the storage tank includes at least one fill line and at least one manway.

11. The mobile fluid storage tank of claim 1, wherein the storage tank includes at least one inlet/outlet line and a plurality of drains.

12. A mobile fluid storage tank comprising:
    a base portion having a front end and a rear end;
    a substantially vertical front wall attached to the front end of said base portion;

a substantially vertical rear wall attached to the rear end of said base portion;

a first vertical side wall attached to said base portion and to said front and rear walls, said first vertical side wall having a generally decagonal shape;

a second vertical side wall attached to said base portion and to said front and rear walls, said second wall being parallel said first wall and having a generally irregular heptagonal shape;

a rear end roof portion extending across the rearward portion of said side walls defining a rear storage chamber;

a front end roof portion extending across the forward portion of said side walls defining a front storage chamber so that said rear and front storage chambers are in fluid communication;

said front end roof portion comprising a sloped portion and at least a two-stepped portion, said sloped portion being substantially parallel with said stepped portion and said stepped portion including at least two steps;

said first vertical side wall being positioned adjacent said two stepped portion;

said second vertical wall being positioned adjacent said sloped portion; and an inclined stairway attached to said front wall and extending from said stepped portion adjacent one side wall downwardly to the other side wall proximate said base portion.

13. The mobile fluid storage tank of claim 12, wherein at least two steps of the stepped portion comprising a step plate and a riser plate extending generally normal to said step plate, said riser plate being joined at an edge to said step plate.

14. The mobile fluid storage tank of claim 12, wherein the inclined stairway further comprises:

a pair of parallel, upwardly and laterally extending risers along said forward wall;

a plurality of steps extending between said risers;

a hand rail disposed above and extending parallel to said risers, said hand rail having an upper section and a lower section separated from said upper section; and said upper section including a trapezoidally configured shape and being pivotally connected to said lower section for allowing said upper section to pivot from an upwardly extending position to a folded down position.

15. The mobile fluid storage tank of claim 14, wherein the inclined stairway further includes a platform positioned on said stairway adjacent said stepped portion, said platform including a pivotally connected generally rectangular-shaped gate positioned opposite said plurality of steps and perpendicular to said hand rail.

16. The mobile fluid storage tank of claim 12, wherein each step of the stepped portion includes a walkway and two sets of parallel foldable hand rails, each set of parallel foldable hand rails being positioned on opposite sides of said walkway.

17. The mobile fluid storage tank of claim 16, wherein the walkway comprises a horizontally extending foot walk positioned a short distance above each step plate.

18. The mobile fluid storage tank of claim 17, wherein each foot walk is formed of a skid resistant metal grading.

19. The mobile fluid storage tank of claim 12, wherein the storage tank includes at least one fill line and at least one manway.

20. A mobile fluid storage tank comprising:

a base portion having a front end and a rear end;

a substantially vertical front wall attached to the front end of said base portion;

a substantially vertical rear wall attached to the rear end of said base portion;

a first vertical side wall attached to said base portion and to said front and rear walls, said first vertical side wall having a generally decagonal shape;

a second vertical side wall attached to said base portion and to said front and rear walls, said second wall being parallel said first wall and having a generally irregular heptagonal shape;

a rear end roof portion extending across the rearward portion of said side walls defining a rear storage chamber;

a front end roof portion extending across the forward portion of said side walls defining a front storage chamber so that said rear and front storage chambers are in fluid communication;

said front end roof portion comprising a sloped portion and at least a two-stepped portion, said sloped portion being substantially parallel with said stepped portion and said stepped portion including at least two steps;

said first vertical side wall being positioned adjacent said two stepped portion;

said second vertical wall being positioned adjacent said sloped portion;

an inclined stairway attached to said front wall and extending from said stepped portion adjacent one side wall downwardly to the other side wall proximate said base portion, said stairway having a pair of parallel, upwardly and laterally extending risers along said forward wall, a plurality of steps extending between said risers, and a hand rail disposed above and extending parallel to said risers, said hand rail having an upper section and a lower section separated from said upper section.

* * * * *